United States Patent [19]

Castle

[11] 4,227,731
[45] Oct. 14, 1980

[54] TOOL FOR LIFTING AND MANEUVERING UTILITY ACCESS COVERS

[76] Inventor: Alfred B. Castle, 4104 Maryland Ave., Bethesda, Md. 20016

[21] Appl. No.: 80,233

[22] Filed: Oct. 1, 1979

[51] Int. Cl.$^3$ .............................................. B65G 7/12
[52] U.S. Cl. ....................................................... 294/17
[58] Field of Search ............... 294/17, 15, 12, 2, 19 R, 294/24; 254/131, 133, 129, 124, 30; 81/177 E, 177 D; 145/65; 292/173, 169.14

[56] References Cited

U.S. PATENT DOCUMENTS

| | | | |
|---|---|---|---|
| 530,361 | 12/1894 | Smith et al. | 294/17 |
| 2,086,318 | 7/1937 | Jackson | 294/17 |
| 2,348,978 | 5/1944 | Kinner | 294/17 |
| 3,751,949 | 8/1973 | Castle | 292/169.14 |

*Primary Examiner*—James B. Marbert
*Attorney, Agent, or Firm*—Murray & Whisenhunt

[57] ABSTRACT

A lifting tool suitable for lifting and maneuvering utility access covers, especially manhole covers, including a handle and an arcuate receiving means connected to the handle for receiving and securely retaining the utility access cover during lifting and maneuvering thereof. The cover abuts against an abutment means when it is received in the receiving portion, and a hook is pivotally connected to the abutment means for engaging the tool with the cover. When the cover is engaged with the tool, it cannot accidentally become disengaged and injure the operator, and the provision of a support plate on the bottom of the tool facilitates complete control over the movement of the tool when the cover is engaged therewith.

8 Claims, 5 Drawing Figures

1

TOOL FOR LIFTING AND MANEUVERING UTILITY ACCESS COVERS

The present invention relates to a tool suitable for lifting and maneuvering utility access covers, especially manhole covers and gratings.

BACKGROUND OF THE INVENTION

As is well known, many utility installations, for example sewer pipes, waste water pipes, electric cable conduits, mains' water supply control valves, transformers, and the like, are positioned below ground level. Access to these utility installations is generally achieved by climbing through an entrance hole at ground level and down a vertically extending access conduit, usually a cylindrical pipe having a diameter large enough to permit a person to gain access to the utility installation.

The access conduit entrance is invariably provided with a utility access cover which is usually fabricated from a rigid robust material such as cast iron or reinforced concrete and, as a result, is heavy and difficult to maneuver. The utility access covers most generally used are fabricated from cast iron and have at least two holes near to the outer circumferential edge of the cover for use in removing the cover from the entrance hole. In position, the cover is seated in a cover support ring situated such that the cover and the ring are substantially in the plane of the surrounding surface, such as that of the road or sidewalk surface. The technique usually employed for lifting and maneuvering these covers is to use a crow bar, trap hook, or similar metallic rod-like tool by inserting the tool into one of the holes in the cover and pulling the tool upwards and outwards towards the operator, relying on friction between the cover and the tool to effect lifting of the cover. Alternatively, the cover may be removed by forcing the cover out of its support ring by jamming the tool between the outer peripheral edge of the cover and the support ring. In both instances, very little control over the movement of the cover can be maintained and, furthermore, there is always the chance that the cover may drop off the tool and injure the operator, for example by falling on his legs or feet.

In light of the above, it can be appreciated that there exists a significant need for a tool which can be conveniently used to lift and maneuver utility access covers, especially heavy cast iron manhole covers, while maintaining complete control over the movement of the cover and without risk of the cover becoming disengaged from the tool and possibly injuring the person lifting the cover.

In order to prevent access to utility installations of the type mentioned above by unauthorized personnel, for example children, it is becoming common practice to provide utility access covers with locking devices. One locking device which is finding increasing use for this purpose is that described in U.S. Pat. No. 3,751,949 to Alfred B. Castle, the inventor of the invention of the present application. It would accordingly be desirable to provide a tool which is adapted for lifting and maneuvering utility access covers which are provided with a locking device, such as that described in the above-mentioned United States patent. Other locking systems which can be readily adapted for use with utility access covers have been invented by Alfred B. Castle, and these are described in U.S. Pat. Nos. 2,608,085; 3,201,161; and 3,751,949. Insofar as the disclosures of these patents are relevant to the present application in that they disclose locking systems which may be used with utility access covers, the disclosures of the four United States patents mentioned above are specifically incorporated herein by reference.

SUMMARY OF THE INVENTION

It has now been found, surprisingly, that the above-mentioned problems and disadvantages associated with the use of prior known tools for lifting and maneuvering utility access covers can be overcome according to the invention of this application. More specifically, the present invention provides a tool suitable for lifting and maneuvering utility access covers. As used herein, the expression "utility access cover" means any cover which is commonly employed to restrict access to utility installations, usually those located below ground level. More particularly, this expression is intended to include circular "manhole" covers, having at least one hole located near an outer peripheral edge and extending through the top surface of the cover, gratings having parallel spaced-apart bars of rectangular cross-section and generally placed over transformer installations and the like, reinforced concrete utility covers, and any other type of cover designed to prevent entry to utility installations by unauthorized personnel.

The lifting tool of this invention comprises a handle and a receiving means connected to the handle. The receiving means receives and retains a utility access cover during lifting and maneuvering thereof, and as explained in greater detail below, the tool is designed so that there is no possibility of the cover accidentally becoming disengaged from the tool during this lifting and maneuvering. An abutment means is connected to the receiving means for abuttingly engaging with the cover when the cover comes into receiving engagement with the receiving means. Engaging means for engaging the tool with the cover are pivotally connected to the abutment means, and guiding means are connected to the receiving means for guiding the cover into receiving engagement with the receiving means. The receiving means includes a cover-engaging surface extending between the guiding means and the abutment means along which the cover slides when coming into receiving engagement with the receiving means. During operation, the engaging means and the guiding means cooperate to lift the cover and slidingly urge the cover along the cover engaging surface into abutting engagement with the abutment means when the handle is urged downwardly away from the cover. In this way, complete control is maintained over movement of the cover as it is brought into receiving engagement with the receiving means where it is securely retained during lifting and maneuvering so that there is no risk of the cover falling off the tool and injuring the operator. A further advantageous feature of the tool of the invention is that it has superior mechanical advantage which further aids in the controlled and safe lifting and maneuvering of the cover. Thus, as the length of the handle is increased, a greater mechanical moment is created making lifting and maneuvering of the cover a relatively effortless operation.

BRIEF DESCRIPTION OF THE DRAWINGS

Further features and advantages of the tool of the invention will become apparent upon consideration of the following detailed description of one specific embodiment, especially when taken in conjunction with the accompanying drawings, wherein.

DESCRIPTION OF PREFERRED EMBODIMENT

Figure 4:
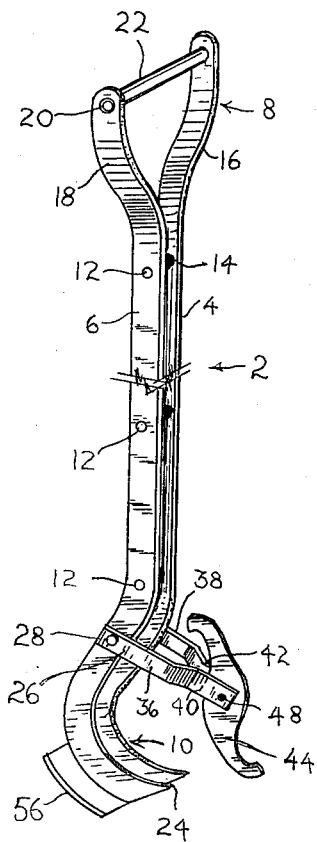
FIG. 4 is a perspective elevation of the tool of the invention.

Referring initially to FIG. 4, there is shown the tool of the invention, generally referenced 2. The tool is generally fabricated from metal, typically steel or aluminum, and in the embodiment shown comprises two spaced parallel elongate metal bars 4,6 diverging at one end to form a gripping portion 8. A utility access cover receiving means 10 is formed at the other end of the tool and this is described in detail below. The bars 4,6 are maintained in a spaced parallel configuration by spacers, usually rivets 12 extending between the bars 4,6. Tubes 14 are mounted on each of the rivets 12 between the bars to maintain them in a spaced configuration.

As can be clearly seen in FIG. 4, the gripping portion 8 is conveniently formed by providing divergent end portions 16,18 of the bars 4,6. The gripping portion is completed by providing an elongate rivet 20 near the end of the divergent portions 16,18, and preferably placing a piece of tubular material 22, suitably of metal or plastic material, on the rivet 20 such that the tubular material is freely rotatable when gripped by the user.

The receiving means, generally referenced 10, is formed at the end of the tool opposite from that of the gripping portion 8. As can be seen from the drawings, the receiving means 10 has a generally arcuate configuration, and a guiding means 24 is provided at the end of the receiving means most remote from the gripping portion 8 for guiding a cover 34 into receiving engagement with the receiving means. The way in which this is achieved will be discussed in more detail below.

Figure 3:
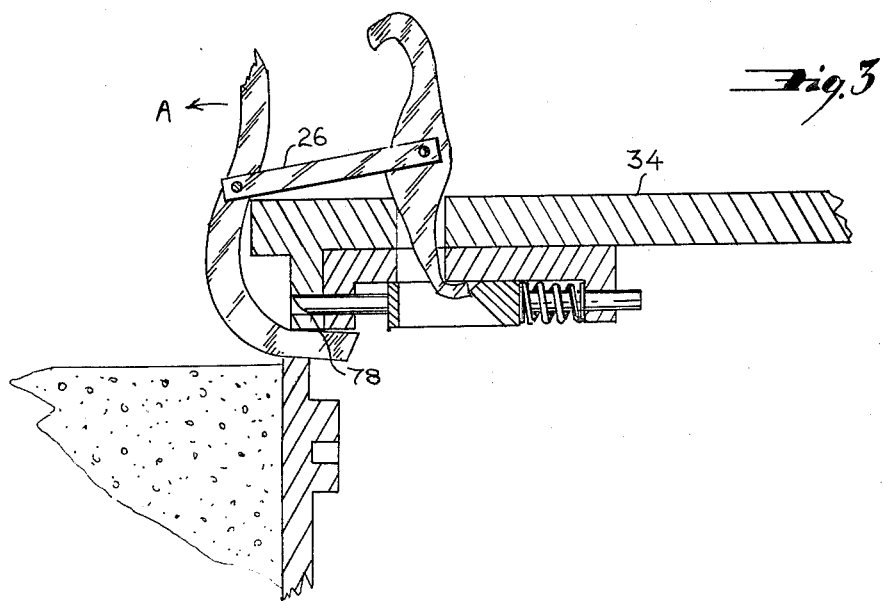
FIG. 3 is a partial cross-sectional side elevation similar to that shown in FIG. 1 with the utility access cover completely withdrawn from its support ring and completely received and securely supported by the tool of the invention.

At a point on the receiving means 10 nearer to the gripping portion 8 is provided an abutment means 26 against which the cover 34 abuts when completely received in the receiving means (see FIG. 3). According to a preferred embodiment, the abutment means is pivotally mounted to the receiving means at 28, and this allows for the tool to be used for covers having variations in the distance of aperture 30 from outer peripheral edge 32 of the cover 34. As can be seen in FIG. 4, the abutment means consists of two spaced-apart bars 36 and 38 having convergent portions 40 and 42. The purpose of convergent portions 40 and 42 is to allow a cover engaging means 44 to be pivotally mounted at the end of abutment means 26. This is discussed in more detail below.

Figure 1:
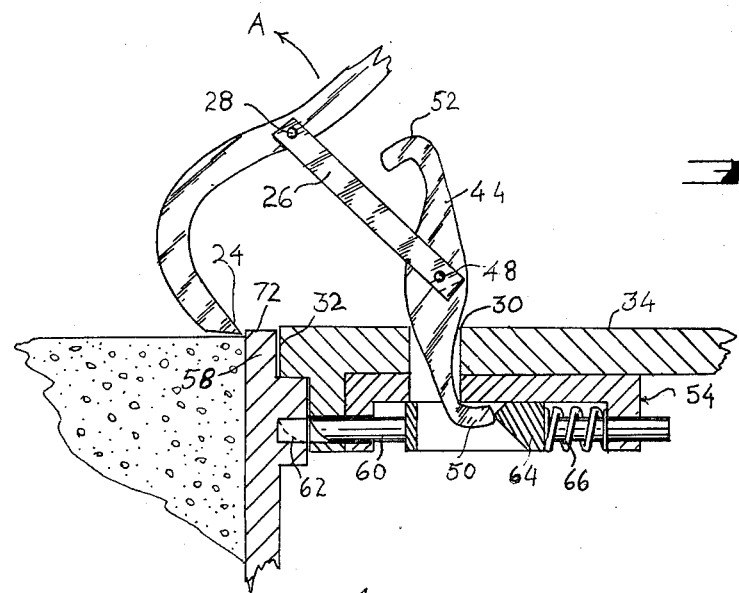
FIG. 1 is a partial cross-sectional side elevation showing a lower portion of the tool of the invention in engagement with a utility access cover (having a cover locking device associated therewith) before lifting of the cover has commenced.

Cover engaging means 44 is pivotally connected to the abutment means 26 between convergent portions 40 and 42 at pivot point 48. In the preferred embodiment, as shown in FIG. 1, the cover engaging means 44 is in the form of a plate having a "reverse S" shape having L-shaped finger portions 50,52. It will be appreciated that it is possible to devise any suitable end configuration according to the structural features of the cover intended to be lifted. In the embodiment illustrated, finger portion 50 is particularly designed to actuate locking device 54 mounted on an underside of cover 34 (see FIGS. 1–3), and finger portion 52 is designed for use with a utility access cover having only an aperture 30 and no locking device positioned on the underside of the cover.

Figure 5:
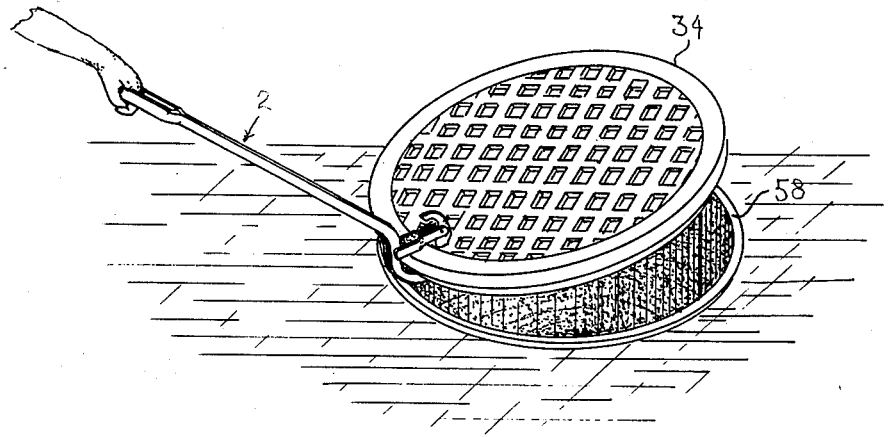
FIG. 5 is a perspective elevation showing a utility access cover partially removed from its support ring using the tool of the invention.

In order to increase the stability of the tool when a utility cover is engaged with and being maneuvered by the tool, and also to facilitate sliding the tool and cover away from the hole, a plate 56 is securely fastened, for example by welding or riveting, to the underside of the receiving means 10, as shown in FIG. 4. For purposes of clarity, plate 56 has been omitted from FIGS. 1–3. It will be seen from FIG. 5 that when the utility access cover is engaged with the tool, and inclined upwardly from the housing, the tool is supported on plate 56. This not only facilitates sliding the tool away from the hole, but also reduces the chances of the tool uncontrollably rocking from side to side with possible injury to the user.

Figure 2:
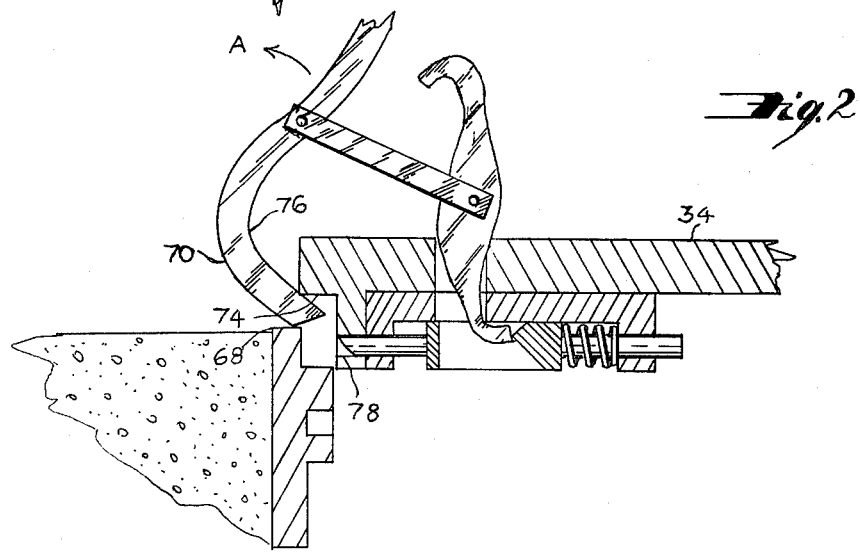
FIG. 2 is a partial cross-sectional side elevation similar to that shown in FIG. 1 with the utility access cover partially withdrawn from its support ring.

The operation of the tool of the invention will now be described with particular reference to FIGS. 1 through 3, where the cover is a conventional manhole cover and is provided with a locking device 54. However, the following description applies equally to the situation where the cover is not provided with any locking device, and where the cover may not be a conventional manhole cover but, say, a grating or concrete cover. FIG. 1 shows the lower portion of the tool engaged with the cover 34. However, no upward movement of the cover out of support ring 58 has yet occurred. It will be noted that prior to engagement of the tool with the cover, locking device 54 is in the locked position with stud 60 engaged in annular groove 62 as shown in dashed outline in FIG. 1. Upon insertion of finger portion 50 into the aperture 30, the finger 50 comes into contact with abutment region 64 of the locking device. Stud 60 is connected to abutment region 64, and stud 60 is urged into engagement with the annular groove 62 by a coil spring 66 pressing on abutment region 64. Upon moving the tool in the direction of arrow A (FIG. 1), the guiding means 24 abuts against a protruding portion 68 of support ring 58, and finger portion 50 urges abutment region 64, and consequently stud 60, towards the right (as seen in FIG. 1) out of locking engagement with annular groove 62. Upon continued movement of the tool in the direction of arrow A, the cover 34 begins to rise and guiding means 24 moves onto top horizontal portion 72 of the ring 58 as seen in FIG. 2. At this point, it will be seen that the guiding means 24 has come into engagement with lip 74 of the cover 34. As the tool is moved further in the direction of arrow A, the cover gradually slides along cover engaging surface 76 of the receiving means 10 until the cover comes into abutting engagement with the abutment means 26, as shown in FIG. 3. Simultaneously, underside 70 of the receiving means slides over portion 72, until the stage shown in FIG. 3 is reached. In FIG. 3, the guiding means 24 has now progressed so that it is in contact with the underside 78 of the utility access cover 34. The utility access cover is now securely retained in engagement with the tool and can be readily maneuvered by rocking or sliding the tool on the plate 56 away from the utility access hole. If desired, it is possible to leave the tool in engagement with the cover until work on the utility installation has been completed thereby making return of the cover to the support ring a convenient and controlled process. Alternatively, the tool can be disengaged from the cover once it has been completely removed from the access hole, and the cover can be manually returned into position over the manhole.

From the above description, it will be apparent that the tool of the invention offers significant advantages over prior tools which are currently employed to lift and maneuver utility access covers. In particular, the tool of the invention ensures controlled and safe handling of the cover during lifting and maneuvering thereof, and also has superior mechanical advantage, whereby lifting of heavy covers can be achieved without the expenditure of excessive effort on the part of the operator.

What is claimed is:

1. A lifting tool suitable for lifting and maneuvering a utility access cover having an attachment point at or near an outer peripheral edge of said cover, said tool comprising:
   (a) a handle;
   (b) receiving means connected to said handle for receiving and retaining said utility access cover during lifting and maneuvering thereof;
   (c) abutment means for abuttingly engaging said cover when said cover comes into receiving engagement with said receiving means, said abutment means having first and second spaced-apart pivot points, said abutment means being pivotally connected to said handle at said first pivot point;
   (d) cover engaging means pivotally connected to said abutment means at said second pivot point for engaging said tool to said attachment point of said cover; and
   (e) guiding means connected to said receiving means for guiding said cover into receiving engagement with said receiving means;
said receiving means including a cover engaging surface extending between said guiding means and said abutment means, said cover being slidingly engagable with said cover engaging surface, said cover engaging means and said guiding means cooperating to lift said cover and slidingly urge said cover along said cover engaging surface into abutting engagement with said abutment means upon urging said handle away from said cover,
   whereby said cover is brought into engagement with said receiving means and securely retained in said receiving means during lifting and maneuvering of said cover.

2. A lifting tool according to claim 1, wherein said receiving means has an arcuate configuration.

3. A tool according to claim 1, wherein said cover engaging means includes at least one L-shaped finger receivable in an aperture in said utility access cover.

4. A tool according to claim 1, wherein said cover engaging means consists of a plate having two oppositely facing finger portions in the plane of said plate and at opposite ends of said plate.

5. A tool according to claim 4, wherein one of said L-shaped portions is engageable with a locking device associated with said utility access cover to actuate said locking device.

6. A tool according to claim 5, wherein said locking device is mounted on an underside of said cover, and is actuated by engagement with one of said L-shaped portions projecting through an aperture in said utility access cover.

7. A tool according to claim 1, wherein said guiding means is engageable with a surface of a support ring for said utility access cover.

8. A lifting tool suitable for lifting and maneuvering a utility access cover having an aperture near an outer peripheral edge of said cover, said tool comprising:
   (a) a handle;
   (b) receiving means connected to said handle for receiving and retaining said utility access cover during lifting and maneuvering thereof, said receiving means having a first end and a second end, said receiving means having an arcuate cover engaging surface extending between said first and second ends, said cover being slidingly engagable with said arcuate cover engaging surface;
   (c) abutment means for abuttingly engaging said cover when said cover comes into receiving engagement with said receiving means, said abutment means having first and second spaced-apart pivot points, said abutment means being pivotally connected at said first pivot point to said first end of said receiving means;
   (d) cover engaging means pivotally connected to said abutment means at said second pivot point for engaging said tool to said aperture in said cover, said cover engaging means having at least one L-shaped portion engagable with said aperture in said cover; and
   (e) guiding means connected to said second end of said receiving means for guiding said cover into receiving engagement with said receiving means, said guiding means terminating in a wedge-shaped portion engagable with a point on a cover support ring;
said cover engaging means and said guiding means cooperating to lift said cover and slidingly urge said cover along said arcuate cover engaging surface into abutting engagement with said abutment means upon urging said handle away from said said cover, whereby said cover is brought into receiving engagement with said receiving means and securely retained in said receiving means during lifting and maneuvering said cover.

* * * * *